United States Patent
Broze et al.

(10) Patent No.: US 9,649,661 B2
(45) Date of Patent: May 16, 2017

(54) PIPELINE PIG AND METHOD FOR USING THE PIG

(71) Applicant: SHELL OIL COMPANY, Houston, TX (US)

(72) Inventors: James George Broze, Houston, TX (US); Yile Li, Katy, TX (US); Xiangyang Zou, Katy, TX (US)

(73) Assignee: SHELL OIL COMPANY, Houston, TX (US)

( * ) Notice: Subject to any disclaimer, the term of this patent is extended or adjusted under 35 U.S.C. 154(b) by 103 days.

(21) Appl. No.: 14/414,353

(22) PCT Filed: Jul. 10, 2013

(86) PCT No.: PCT/US2013/049837
§ 371 (c)(1),
(2) Date: Jan. 12, 2015

(87) PCT Pub. No.: WO2014/011718
PCT Pub. Date: Jan. 16, 2014

(65) Prior Publication Data
US 2015/0217323 A1 Aug. 6, 2015

Related U.S. Application Data

(60) Provisional application No. 61/670,850, filed on Jul. 12, 2012.

(51) Int. Cl.
*B05D 1/28* (2006.01)
*B05D 7/22* (2006.01)
(Continued)

(52) U.S. Cl.
CPC ............. *B05D 7/222* (2013.01); *B05C 7/08* (2013.01); *B05D 1/28* (2013.01); *B05D 7/146* (2013.01);
(Continued)

(58) Field of Classification Search
CPC ......... B05D 1/28; B05D 7/222; F16L 55/164; F16L 55/1645; F16L 55/16455;
(Continued)

(56) References Cited

U.S. PATENT DOCUMENTS 2,112,212 A 3/1938 Purcell et al.
3,112,227 A * 11/1963 Curtis .................. B05C 7/08
118/105
(Continued)

FOREIGN PATENT DOCUMENTS

| CA | 2240330 | 3/2004 |
|---|---|---|
| FR | 2185942 | 1/1974 |

(Continued)

OTHER PUBLICATIONS

PCT International Search Report, Application No. PCT/US2013/049837 dated Oct. 16, 2013.

*Primary Examiner* — William Phillip Fletcher, III

(57) ABSTRACT

A pipeline pig for wetting the top inner surface of a pipeline comprising a pig body, one or more circular brushes attached to the pig body, and means for rotating the one or more circular brushes as the pig moves through the pipeline.

4 Claims, 5 Drawing Sheets

(51) Int. Cl.

| | |
|---|---|
| *F16L 55/1645* | (2006.01) |
| *F16L 55/26* | (2006.01) |
| *F16L 55/40* | (2006.01) |
| *F16L 55/164* | (2006.01) |
| *F16L 55/18* | (2006.01) |
| *B08B 9/055* | (2006.01) |
| *B05C 7/08* | (2006.01) |
| *B05D 7/14* | (2006.01) |
| *B24B 27/033* | (2006.01) |
| *B24B 29/00* | (2006.01) |
| *B24B 5/36* | (2006.01) |
| *B24B 5/40* | (2006.01) |
| *B08B 1/04* | (2006.01) |
| *B08B 9/04* | (2006.01) |
| *F16L 101/16* | (2006.01) |
| *B08B 9/051* | (2006.01) |

(52) U.S. Cl.
CPC .......... *B08B 9/0553* (2013.01); *B08B 9/0557* (2013.01); *B24B 5/363* (2013.01); *B24B 5/40* (2013.01); *B24B 27/033* (2013.01); *B24B 29/005* (2013.01); *F16L 55/164* (2013.01); *F16L 55/1645* (2013.01); *F16L 55/16455* (2013.01); *F16L 55/18* (2013.01); *F16L 55/26* (2013.01); *F16L 55/40* (2013.01); *B08B 9/051* (2013.01); *F16L 2101/16* (2013.01)

(58) Field of Classification Search
CPC . F16L 55/18; F16L 55/26; F16L 55/40; F16L 2101/16
USPC ..... 118/215, DIG. 10; 138/97; 427/230, 368
See application file for complete search history.

(56) References Cited

U.S. PATENT DOCUMENTS

| | | | |
|---|---|---|---|
| 3,135,629 A | 6/1964 | McLean | |
| 3,541,628 A * | 11/1970 | Girard | B08B 9/0553 15/104.061 |
| 3,703,947 A | 11/1972 | Landrum | |
| 3,885,521 A * | 5/1975 | von Arx | B05C 7/08 118/105 |
| 4,069,535 A * | 1/1978 | Cato | B08B 9/0553 15/104.061 |
| 4,249,475 A | 2/1981 | Lindsey | |
| 4,425,385 A * | 1/1984 | Coulter | B08B 9/0557 427/230 |
| 4,774,905 A * | 10/1988 | Nobis | B05C 7/02 118/304 |
| 5,230,842 A * | 7/1993 | Munde | B08B 9/0553 118/408 |
| 5,406,666 A | 4/1995 | Werlink | |
| 5,855,676 A * | 1/1999 | Lu | B05C 7/04 118/105 |
| 5,903,946 A | 5/1999 | Collins et al. | |
| 7,270,847 B2 * | 9/2007 | Horn | B05C 7/08 427/230 |
| 7,827,646 B2 * | 11/2010 | Pruett | B08B 9/055 15/104.05 |
| 2008/0263795 A1 | 10/2008 | Chow | |

FOREIGN PATENT DOCUMENTS

| | | |
|---|---|---|
| GB | 850520 | 10/1960 |
| WO | 2011070321 A2 | 6/2011 |
| WO | WO 2011/070321 A1 * | 6/2011 |

* cited by examiner

PIPELINE PIG AND METHOD FOR USING THE PIG

CROSS REFERENCE TO RELATED APPLICATIONS

The present application is a National Stage (§371) of International Application No. PCT/US2013/049837, filed Jul. 10, 2013, which claims priority from U.S. Provisional Application No. 61/670,850, filed Jul. 12, 2012, the disclosures of each of which are hereby incorporated by reference in their entirety.

FIELD OF THE INVENTION

This invention relates to a pipeline pig comprising one or more circular brushes.

BACKGROUND

Pipelines used to transport oil and gas are often subject to corrosion as a result of various components found in the oil and gas. One type of corrosion is referred to as top-of-line corrosion and is caused when liquids, in particular water, condense on the top inner surface of the pipeline. This occurs when a pipeline is operated with a combined gas/liquid flow such that the liquid portion of the flow only contacts a portion of the inner surface of the pipeline. The corrosion is often a result of contaminants in the gas such as carbon dioxide, hydrogen sulfide and/or organic acids, and water condensation as a result of pressure and temperature changes in the pipeline.

Corrosion inhibitors are often injected into the pipeline with the oil and gas to prevent corrosion, but when the pipeline is not operated liquid full the corrosion inhibitor does not come into contact with the top inner surface of the pipeline. As a result, there is not an effective way to treat the top inner surface of the pipeline with corrosion inhibitors. This condensation is especially prevalent in the portion of the pipeline near the wellhead where the oil and gas cools as it leaves the well.

Conventional pigs similar to those disclosed in U.S. Pat. No. 5,903,946 can be used for cleaning the interior of pipes as the pig is moved in an axial direction through the pipe. Even when pigging a pipeline though, the pipeline is typically not liquid full, and there is no way to guarantee that injecting corrosion inhibitors during a pigging operation will result in full contact between the corrosion inhibitor and the top inner surface of the pipeline.

SUMMARY OF THE INVENTION

This invention provides a pipeline pig for wetting the top inner surface of a pipeline comprising a pig body, one or more circular brushes attached to the pig body, and means for rotating the one or more circular brushes as the pig moves through the pipeline.

The invention further provides a method of wetting a top inner surface of a pipeline comprising passing a pig through the pipeline wherein the pig comprises a pig body, one or more circular brushes attached to the pig body, and means for rotating the one or more circular brushes as the pig moves through the pipeline and wherein as the brushes rotate a liquid contained in the pipeline is forced upwards to contact the top inner surface of the pipeline.

The invention also provides a method of holding the corrosion inhibitor between the front and rear discs of the pig, and thus allowing for batch corrosion inhibitor treatment (in comparison with expensive continuous corrosion inhibitor injection).

DETAILED DESCRIPTION

This invention provides a pig that can be used to prevent top-of-line corrosion by ensuring that the corrosion inhibitor injected into a pipeline comes into contact with the top inner surface of the pipeline. The embodiments of this pig and the means for rotating the pig to ensure that the liquid is carried to the top inner surface of the pipeline are described in more detail herein, and especially with regards to the figures.

Figure 1:
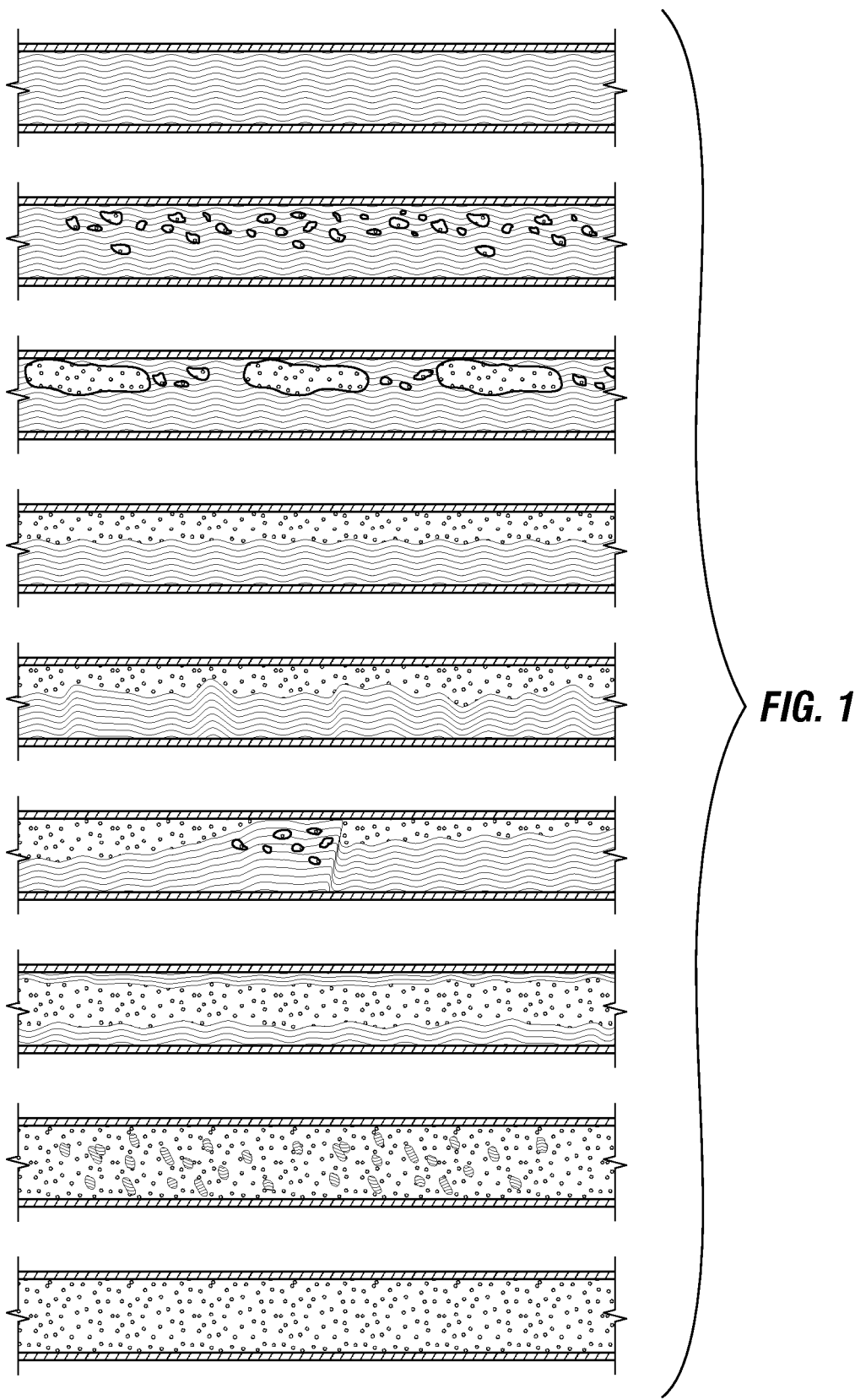
FIG. 1 depicts different flow regimes in a pipeline.

Various flow regimes can be encountered in a pipeline, including: liquid full, bubble, plug, stratified, wavy, slug, annular, mist and gas. These will be further described below with respect to FIG. 1. A liquid full flow regime is when the entire pipeline is liquid full and there is no gas present in the pipeline. This is the only flow regime that could ensure that a corrosion inhibitor injected into the pipeline would contact the top inner surface of the pipeline. A bubble flow regime is when the majority of the pipeline is liquid full, but bubbles of gas are dispersed throughout the liquid. A plug flow regime is when plugs of vapor (larger than the bubbles) are present in the pipeline, and these are typically found near the top inner surface of the pipeline. A stratified flow regime occurs when the liquid flow and the gas flow are separated into two separate phases, with the liquid flowing in the bottom portion of the pipeline and the gas flowing in the upper portion of the pipeline. A wavy flow regime is similar to the stratified flow regime except the liquid flow creates a series of waves of liquid that flow through the pipeline. A slug flow regime is when the liquid and gas flow separately through the pipeline but slugs of liquid pass through the pipeline such that certain sections of the pipeline may experience liquid full conditions. An annular flow regime is when the liquid flows along the surfaces of the pipeline and the gas flows in the center section of the pipeline. A mist flow regime is when the majority of the flow through the line is gas with small liquid particles carried with the gas and dispersed throughout the pipeline. A gas flow regime is when the entire flow through the pipeline is gas, and no liquid is present.

As can be seen, several of these flow regimes, especially stratified and wavy, are such that the top inner surface of the pipeline is not contacted with liquid. Any liquid corrosion inhibitors that are injected into the liquid will not contact the top inner surface of the pipeline, thus leaving that surface unprotected. Additionally, in some cases, water condensation will occur on the top inner surface of the pipeline which can result in an increased rate of corrosion.

The invention provides a pig with brushes that when rotated sweep the liquid around the entire inner circumference of the pipeline such that the top inner surface of the pipeline and even the upper portion of the sides of the pipeline will be contacted with liquid and corrosion inhibitor when injected into the liquid. The brushes may be rotated by any method known to one of ordinary skill in the art.

The corrosion inhibitor may be injected in batch or continuous operation. The batch operation is preferred because of the cost savings realized from the reduced amounts of chemicals needed.

Figure 2:
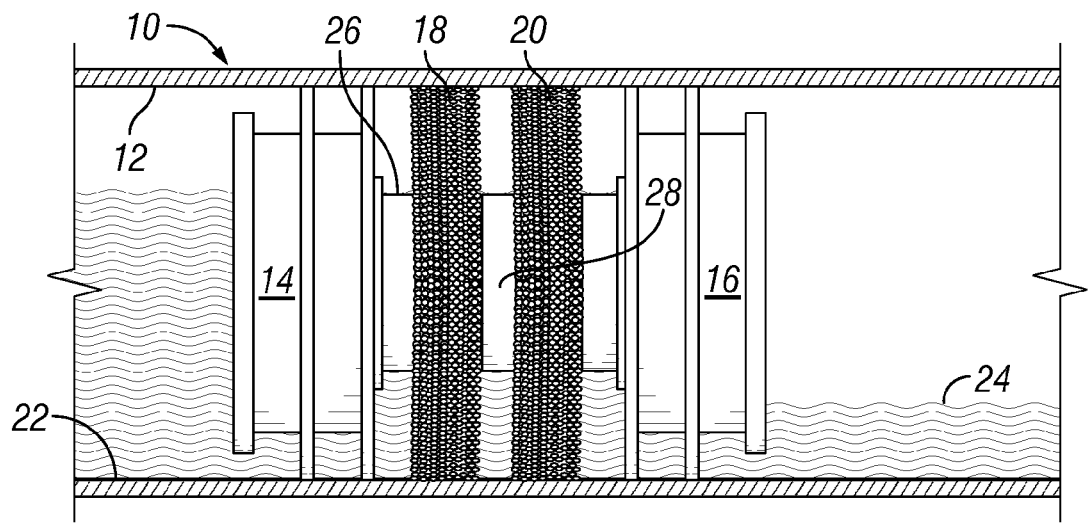
FIG. 2 depicts one embodiment of a pipeline pig according to the invention with brushes in the middle of the pig.

FIG. 2 depicts one embodiment of a pipeline pig according to the invention. This embodiment comprises a pipeline pig with two brushes in the center section of the pig. The pig comprises a front section 16 and a rear section 14, each section comprising three discs. The farthest forward and farthest rearward discs have a diameter smaller than the inner diameter of the pipe. This allows these discs to help guide the pig through the pipe, especially through curves and bends in the pipe. The middle 4 discs, two in front section 16 and two in rear section 14 have a diameter that is the same as or slightly larger than the inner diameter of the pipe. These discs provide a seal between the pig and the pipe.

The sections are connected by a connector 28 that also provides for attaching of the brushes (18 & 20) to the pig. The pig is shown in a pipeline 10 that has a top inner surface 12 and a bottom inner surface 22. The fluid level in the pipeline is shown as 24 and the fluid level between the front and rear sections of the pig is shown as 26. As can be seen from the figure, the liquid level between the pig sections is higher than the level in the pipeline. This is a result of the forward movement of the pig and results in increased wetting of the brushes which are then able to wet the top inner surface of the pipeline as they rotate. The amount of liquid holdup between the front and rear sections can be designed by selecting an appropriate size and geometry for the front and rear sections of the pig. The brushes 18 and 20 can be rotated by any means available to provide rotation to the brushes. The space between the discs where the brushes are installed will be filled with corrosion inhibitors before pig launch. So the liquid level 26 should be full (almost) when the pig just launched. The discs at the front end will help clean the pipeline inner surface (top, bottom or side) before applying fresh corrosion inhibitors, and the discs at the rear end will help coat the pipeline surface evenly with corrosion inhibitors applied by the brushes.

Figure 3:
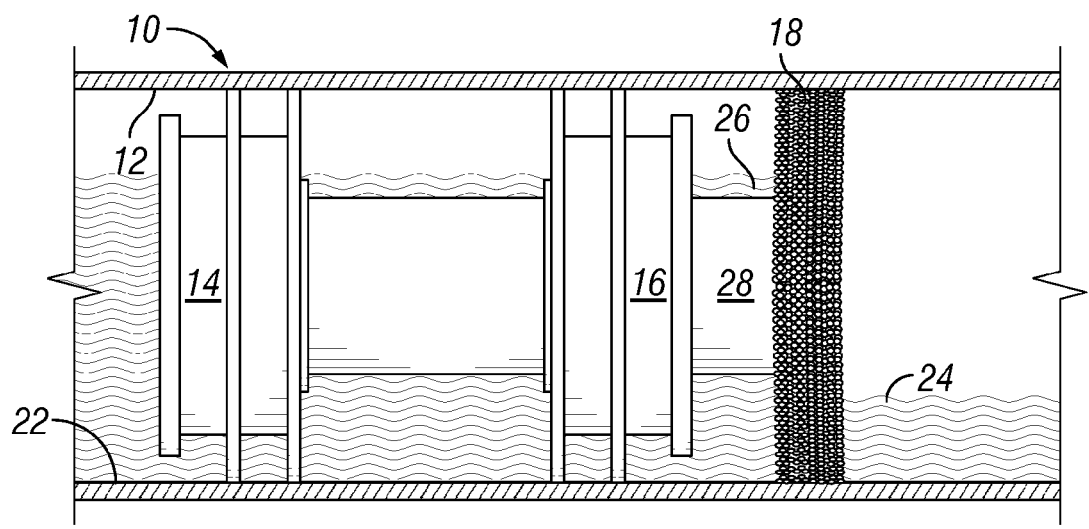
FIG. 3 depicts another embodiment of a pipeline pig according to the invention with a single brush in front.

FIG. 3 depicts another embodiment of a pipeline pig according to the invention. This embodiment is similar to the pig depicted in FIG. 2, except that the pipeline pig has one brush that is located at the front of the pig. The pig comprises a front section 16, a rear section 14 and a brush 18 that is connected to the pig by connector 28. The pipeline and liquid levels are shown and labeled similarly to those in FIG. 2.

Figure 4:
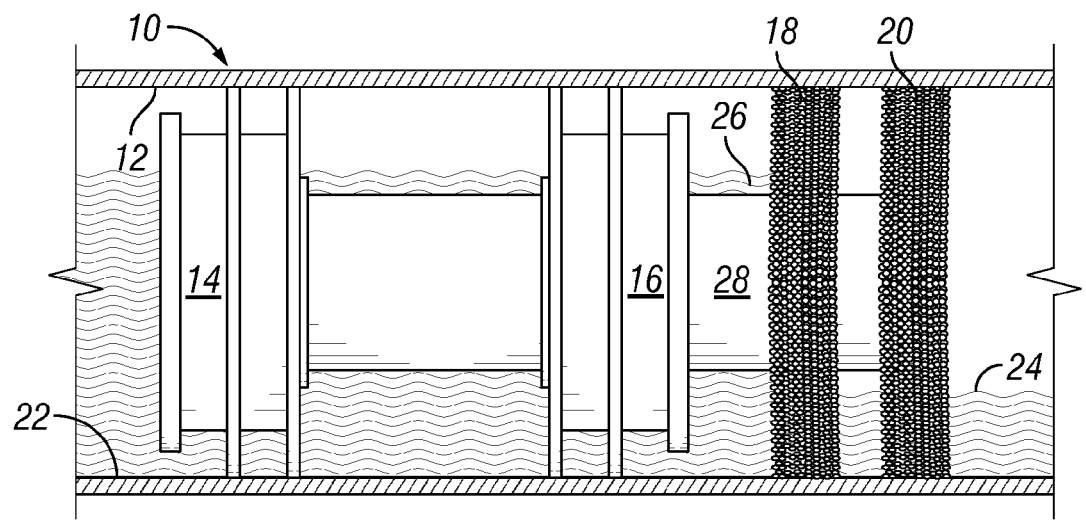
FIG. 4 depicts another embodiment of a pipeline pig according to the invention with two brushes in front.

FIG. 4 depicts another embodiment of a pipeline pig according to the invention. This embodiment has a pipeline pig with two brushes at the front of the pig. The pig comprises a front section 16 and two brushes (18 & 20) that are connected to the pig by connector 28. These two brushes will rotate in different direction so that the forces due to brush rotation on the pig will be cancelled out. The pipeline and liquid levels are shown and labeled similarly to those in FIG. 2.

Figure 5:
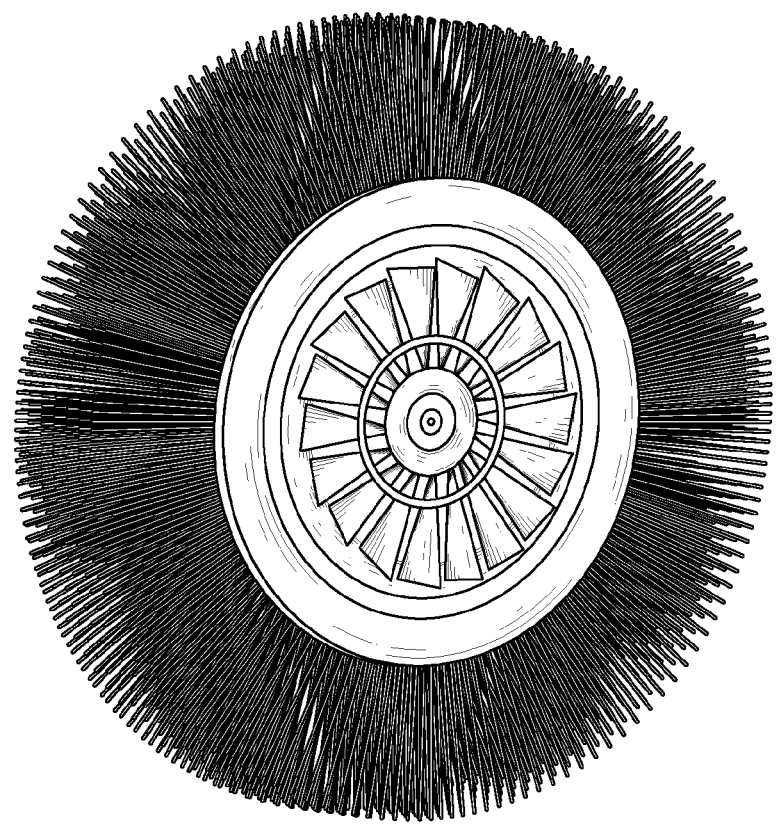
FIG. 5 depicts a view of one of the brushes showing a rotor as means for rotating.

FIG. 5 shows one embodiment of a means for rotating the brushes. According to this embodiment, impellers are located in the center section of the brush. In pipelines that are not liquid full, the non-liquid full cross section of the pipeline typically comprises gas which is also flowing through the pig (pig bypass flow). As the gas flows through the pig, the gas flows through the impellers in the brush. The force from the velocity of the gas is converted by the impellers into a rotational force that then rotates the brushes. As the brushes rotate, the liquid is carried along the inner sides of the pipeline and contacts the top inner surface of the pipeline. In one embodiment, the impellers are located inside the connector 28 (shown in FIGS. 2-4) and the brushes are located outside the connector. In this embodiment, the impellers have to be coupled to the brushes, for example, by magnetic forces.

Figure 6:
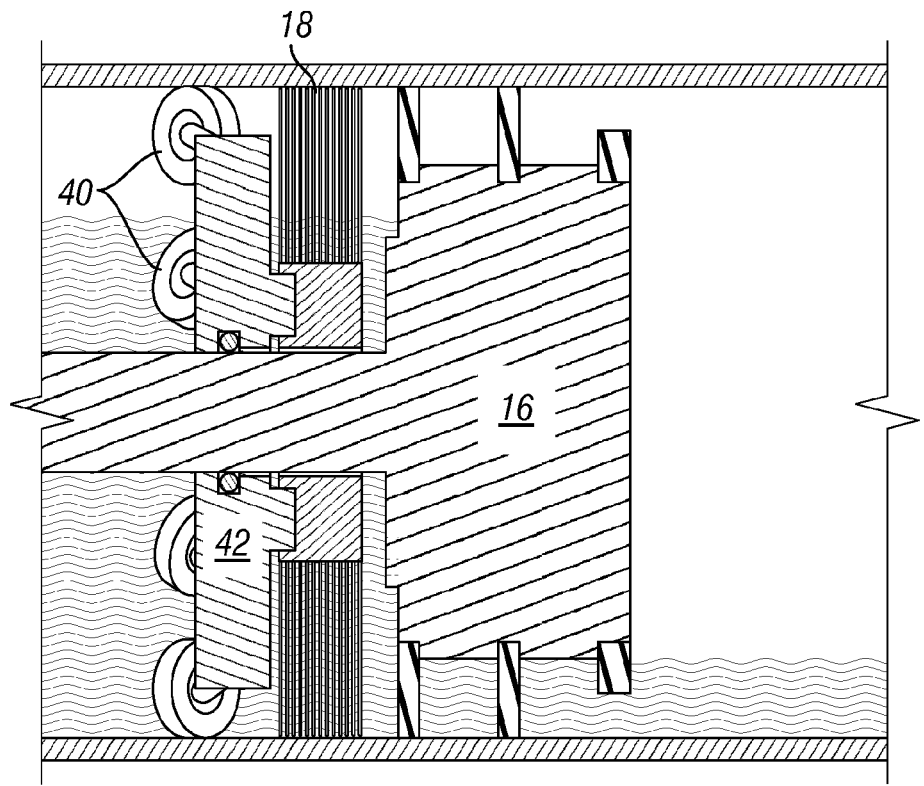
FIG. 6 depicts another embodiment of a pipeline pig according to the invention showing wheels as means for rotating.

FIG. 6 shows another embodiment of a means for rotating the brushes. In this embodiment, wheels 40 are positioned on the pig body or on a wheel system 42 that are angled with respect to the longitudinal axis of the pig. As the pig moves forward through the pipeline, the wheels contact the sides of the pipeline and because of their angled orientation cause the entire body of the pig to rotate inside the pipeline. In one embodiment, the brushes are fixed in position with respect to the pig so that the brushes rotate at the same speed and in the same direction as the pig. FIG. 6 shows the front section 16 comprising three discs. The rear section of the pig is not shown but is connected to the front section by a connector rod.

Figure 7A:
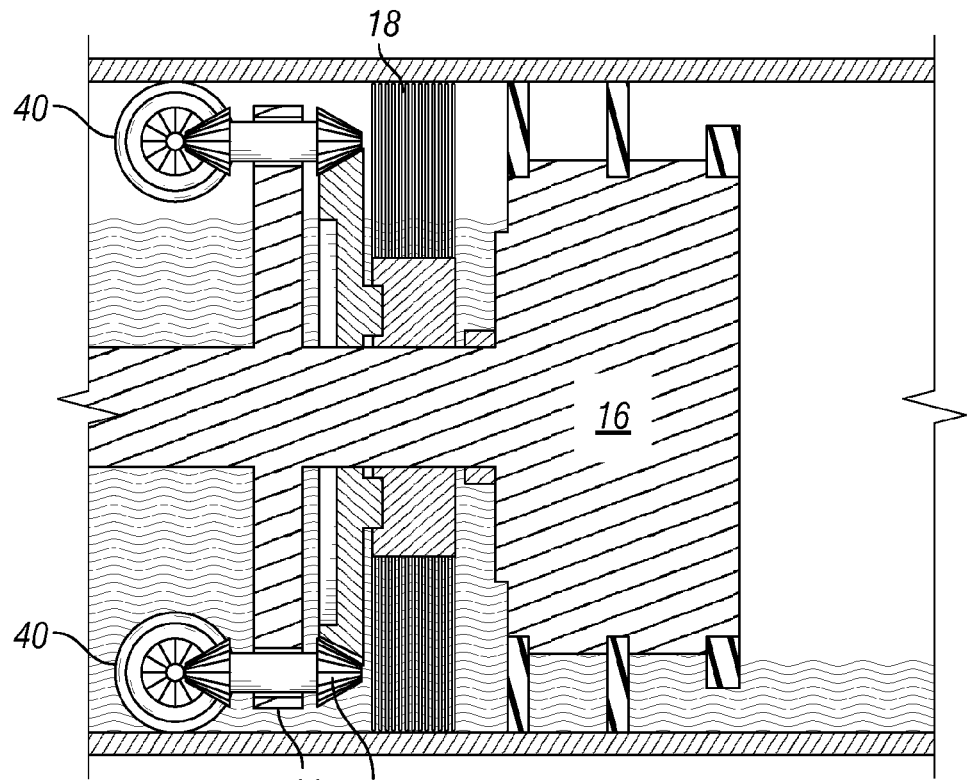
FIG. 7A depicts another embodiment of a pipeline pig according to the invention showing bevel gears as means for rotating.

FIG. 7A shows a further embodiment of a means for rotating the brushes. In this embodiment, beveled gears are positioned to provide a rotational force to the brushes. Wheels are used to contact the sides of the pipeline, but these wheels are parallel to the longitudinal axis of the pig. The wheels are connected to a first set of gears that turn along with the wheels. As the first set of gears turn they rotate a second set of gears that are positioned at an angle of from 0 to 90 degrees from the first set of gears. This second set of gears then imparts a rotational force to the brushes causing them to rotate and push the liquid along the surfaces of the pipeline. In some embodiments, two brushes are used and oriented such that they rotate in opposite directions. This helps stabilize the pig and offsets the rotational forces.

Figure 7B:
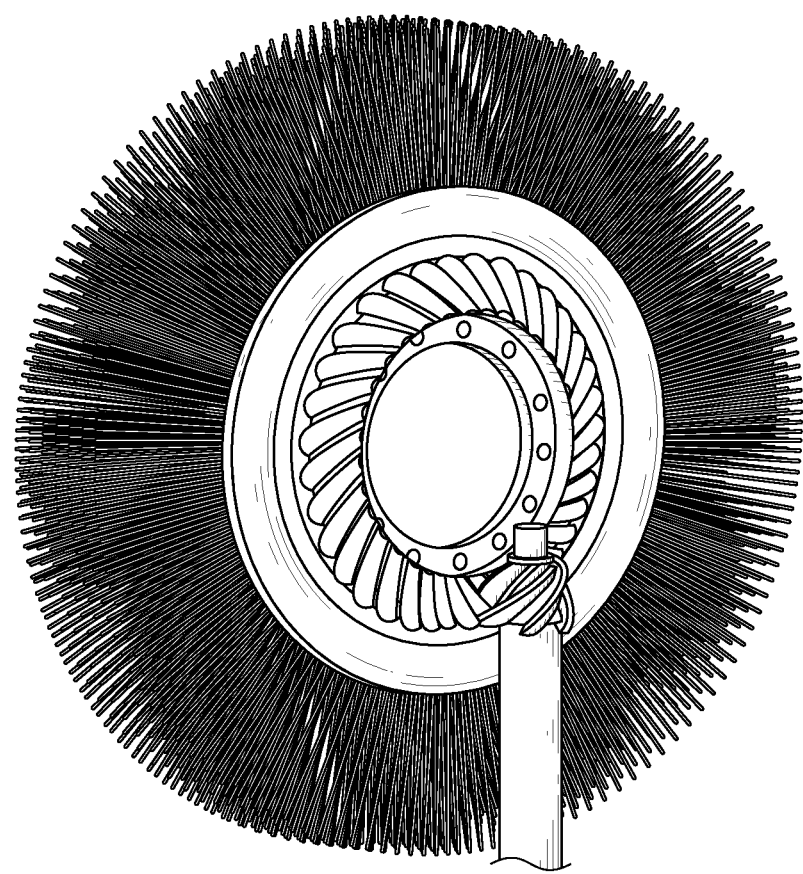
FIG. 7B depicts a view of the brush shown in FIG. 7A showing the gears as means for rotating.

FIG. 7B shows a view of a brush connected to a beveled gear that is connected by another gear to the wheels that roll along the pipeline (not shown).

In addition to preventing corrosion on the top inner surface of the pipeline, the use of this pig provides the conventional benefits of pipe cleaning achieved when using a standard pipeline pig. This pig is especially useful in deepwater applications where it is more difficult to measure and monitor the corrosion on oil and gas pipelines. In addition, any corrosion resulting in loss of containment would cause considerable damage and be difficult to contain due to the depth of the water in which these pipelines are installed.

One of ordinary skill in the art can apply other means for rotating the brushes, including magnetic forces, electromagnetic forces, as well as the use of other devices to convert the force of the gas and/or liquid flow to rotational force. For example, the pig could have a battery and an electric motor that was used to rotate the brushes.

The pig may comprise one, two or more brushes and they may be placed at the front, at the rear or in the middle of the pig. Each of these configurations has different advantages and disadvantages in terms of liquid holdup, ease of manufacture and other important considerations.

The invention claimed is:

1. A method of wetting a top inner surface of a pipeline comprising:
    passing a pig through the pipeline, wherein the pig comprises:
        a pig body, wherein the pig body comprises a front section, a rear section, and a connector connecting the front section to the rear section and wherein the front and rear sections are designed to allow for a liquid holdup between the front and rear sections;
        one or more circular brushes attached to the pig body; and
        means for rotating the one or more circular brushes as the pig moves through the pipeline;
    allowing an amount of liquid to hold up between the front and rear sections, wherein the liquid level between the front and rear section is higher than the liquid level in the pipeline; and
    forcing the liquid held up between the front and rear sections upwards with the one or more circular brushes to contact the top inner surface of the pipeline.

2. The method of claim 1 wherein the liquid comprises a corrosion inhibitor.

3. The method of claim 2 wherein the pig body further comprises discs that form a sealed region of liquid comprising a corrosion inhibitor.

4. The method of claim 1 wherein the top inner surface of the pipeline is substantially coated with liquid as the pig passes through the pipeline.

* * * * *